United States Patent [19]
Zimmerman et al.

[11] 3,892,542

[45] July 1, 1975

[54] REACTOR FOR PRESSURE TYPE GASIFICATION OF COAL

[75] Inventors: Fritz Zimmerman, Essen-Steele; Hans-Joachim Pogrzeba, Essen, both of Germany

[73] Assignee: Steag AG, Essen, Germany

[22] Filed: Sept. 9, 1974

[21] Appl. No.: 504,690

[30] Foreign Application Priority Data
Oct. 17, 1973   Germany............................ 2352078

[52] U.S. Cl. .............................. 48/67; 48/68; 48/73; 48/77
[51] Int. Cl. ............................................... C10j 3/76
[58] Field of Search ............ 48/63, 73, 77, 99, 202, 48/203, 210, 86 R, 67, 68; 23/277 R, 279

[56] References Cited
UNITED STATES PATENTS

| | | | |
|---|---|---|---|
| 985,818 | 3/1911 | Lundgren................................ | 48/63 |
| 1,023,567 | 4/1912 | Huttinger................................ | 48/68 |
| 2,185,077 | 12/1939 | Galusha............................. | 48/68 X |
| 2,808,321 | 10/1957 | Junkers.............................. | 48/68 X |

*Primary Examiner*—R. E. Serwin
*Attorney, Agent, or Firm*—Malcolm W. Fraser, Esq.

[57] ABSTRACT

A reactor of the character indicated has a collector provided on the inside with a side wall equipped with an overflow lip. A pipe extends through the side wall and the reactor shell to a compensating tank. The cooling water flows from the compensating tank to a jacket providing the outer wall of the reactor. The water level in the tank is made equal to that of the collector, so that signals supplied by a sensing element on the tank reflect the actual water level in the collector. A bypass pipe having a pump extends from the lower part of the reactor jacket to the cooling water pipe which leads to the reactor, there being a return pipe for such water from the reactor to the collector. Saturated steam from the upper part of the collector passes to the upper part of the tank and thence to the reactor.

7 Claims, 2 Drawing Figures

REACTOR FOR PRESSURE TYPE GASIFICATION OF COAL

BACKGROUND OF THE INVENTION

The invention concerns a reactor for the pressure type gasification of coal, comprising a reactor chamber between whose wall and shell enclosing the latter, a space for cooling water flow is formed, to which space a collector mounted on the reactor is connected, from which collector the evaporated cooling water in the form of saturated steam flows through a steam pipe and into the reactor; a compensating tank connected to the steam pipe, including a fall tube discharging into the cooling water jacket, and equipped with a sensing element for the measurement of the cooling water level.

In reactors for the pressure type gasification of coal, overheated steam and air are admitted into the reactor along with saturated steam. The air is necessary for the partial combustion of the coal. The heat released thereby is utilized for gasification. The heat absorbed by the cooling water is used to generate saturated steam which, once returned into the reactor, will control the reactions taking place therein. When too much energy is generated in the reactor, i.e., the temperatures increase, then the amount of saturated steam generated will also increase, which will ultimately act against the energy generation, i.e., a drop in temperature.

This essentially automatic control of the process in the reactor is satisfactory only if the cooling water supply is adjusted in such a manner that the water level in the cooling water jacket and the collector remains constant. This is why the compensating tank, forming a system of communicating pipes together with the fall tube, the cooling water jacket and the collector, was provided. The signals supplied by the sensing element are used to control the cooling water supply.

In a known reactor of the type described above, the water level indicated by the sensing element proved not to correspond to the actual conditions. The sensing element indicated instead water levels substantially lower than the actual ones. Thus, the reactor received too much fresh cooling water, and the water level in the collector rose to undesirably high levels. Under such conditions, water hammer is prone to occur. Moreover, both the steam generation and hence the process control as described above are impaired.

SUMMARY OF THE INVENTION

It is an object of the present invention to develop a reactor of the kind described above, in which the water level in the collector can be correctly measured and stabilized.

This problem has been solved by providing the collector with a side wall equipped with an overflow, which sidewall is arranged inside the collector casing and through which the pipe connecting the collector to the compensating tank is led. In this manner, the water level in the collector is no longer influenced by the steam bubbles ascending between the reactor wall and the shell. The water flows into the collector via the overflow only and directly through a cooling water inlet. The water then can flow from the collector into the compensating tank through the pipe connecting the collector to the compensating tank, and from there back into the cooling water jacket between the reactor wall and the casing through the fall tube. Due to the direct connection between the collector and the compensating tank, the water level in the compensating tank is made to equal that in the collector, so that the signals supplied by the sensing element mounted on the compensating tank reflect the actual water level in the collector. Therefore, any distortion of the cooling water supply control is excluded, and the water level in the collector is stabilized. This also has the advantage of providing constant conditions for the process taking place in the reactor, for trouble-free self-control of the process. With the process taking place free of problems, the pressure conditions in the reactor will also remain largely constant, and fluctuations in pressure, as observed in the known design, fail to arise. Thus, it is possible to choose a lighter design for the reactor wall, which will also be beneficial for heat transfer through the reactor wall.

It is most advisable to lay the pipe on the bottom of the collector horizontal to the compensating tank. Then the sensor signals obtained from the collector will be well defined even at low water levels.

The pipe should be properly sealed where it passes through the sidewall to avoid troubles in the water level in the collector due to the steam bubbles ascending from the cooling water jacket.

A simple design is characterized by the fact that the overflow is formed by the top edge of the collector side wall. According to another proposed form of the present invention, another arrangement is also possible, in which the reactor wall is extended over the reactor and is designed as the collector side wall.

It is expedient to arrange a bypass line with a pump between the lower part of the reactor shell and the cooling water inlet, through which bypass line heated water can be fed into the cooling water supply line. It will then be possible to prevent the temperature of the water flowing from the cooling water inlet into the collector from becoming too low to allow condensation of the saturated steam carried in from the collector.

DESCRIPTION OF THE PREFERRED EMBODIMENT

Figure 1:
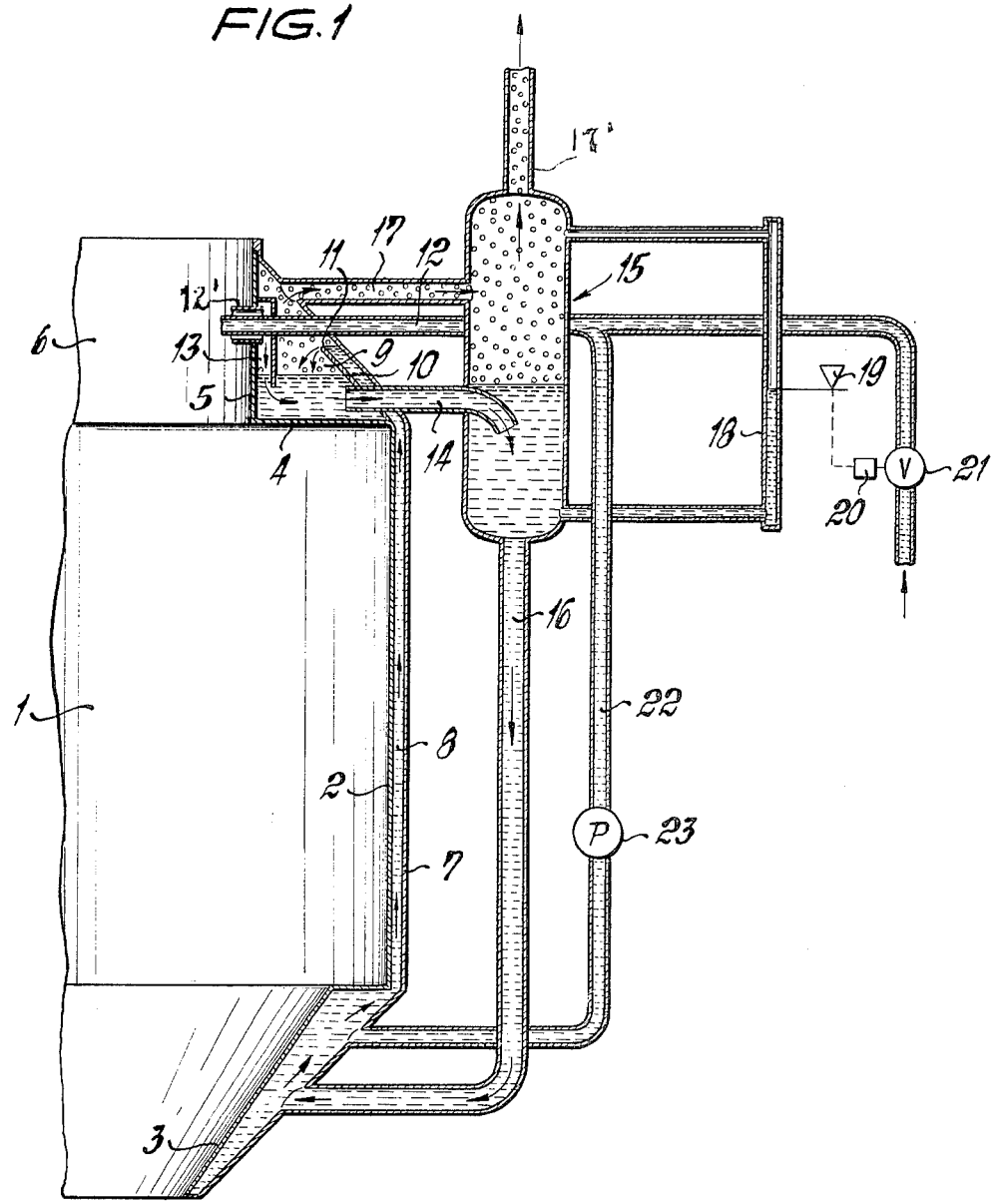
FIG. 1 is a schematic view in vertical section through a portion of a reactor for pressure type coal gasification.
Figure 2:
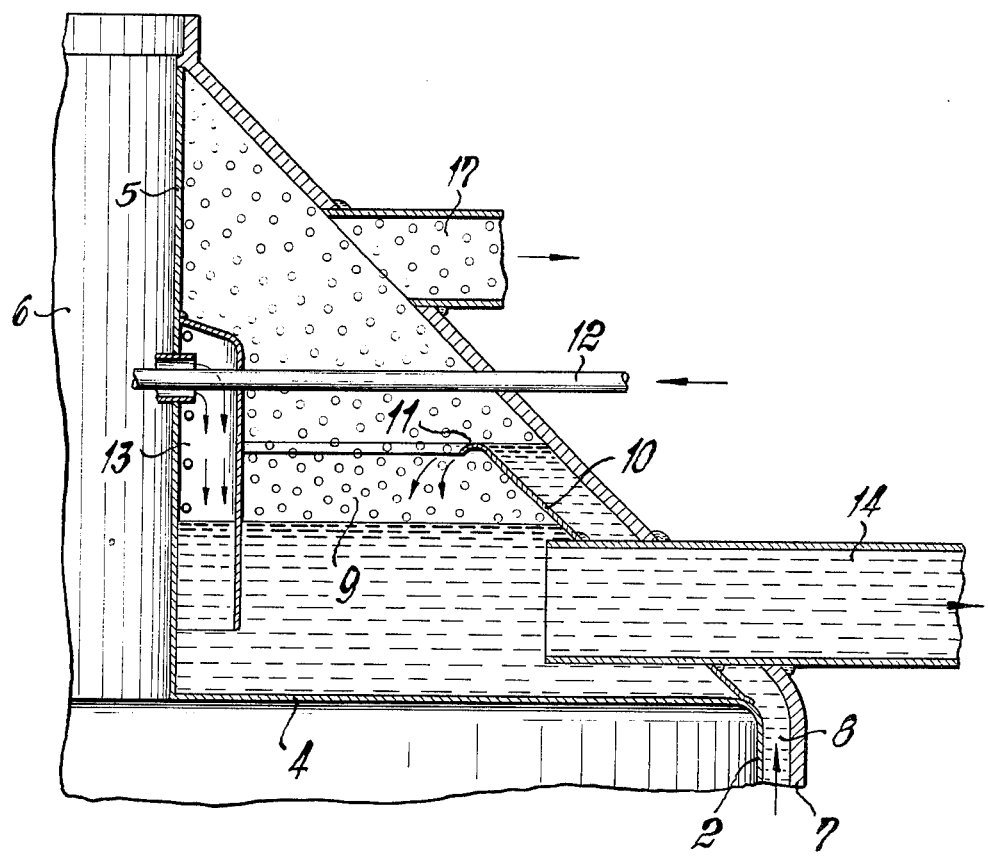
FIG. 2 is an enlarged sectional fragmentary view of the upper end portion of the reactor.

The reactor for pressure type coal gasification as illustrated in FIGS. 1 and 2 comprises an upright reactor housing 1 with a cylindrical reactor wall 2 to whose lower part a conical piece 3 is connected. On its top, the reactor 1 is sealed by a cover 4 which extends to the vertical wall 5 of a feeding chute 6.

Charging and distributing mechanisms for the coal to be gasified in the reactor (not shown) are installed inside the feeding chute 6. Extractors for the spent coal and slag, as well as air, saturated steam and superheated steam inlet pipes (not shown in the Figures), are accommodated in the lower conical part 3.

The reactor wall 2 is enclosed by a concentric outer shell 7 which encloses also the conical part 3 and extends to the top edge of the feeding chute 6. A space 8 through which cooling water flows is enclosed between the reactor wall 2 and the shell 7. A collector chamber 9, with its bottom formed by the cover 4 of the reactor 1, is connected to the space 8. The collector chamber 9 has arranged inside the shell 7, a sidewall 10 whose top edge is designed as an overflow lip 11 for the water flowing upward inside the space 8.

A cooling water pipe 12 is led through the collector 9 and the wall 5 of the feeding chute 6 to the charging and distributing mechanisms (not shown). A return pipe 12' of the cooling water pipe 12 empties into a cooling water inlet 13 in the collector 9.

A pipe 17 leads from the upper part of the collector 9 to a vertical compensating tank 15, having an upper outlet to the reactor for saturated steam. A horizontal pipe 14 is disposed adjacent the bottom of the collector 9 and leads to the tank 15. The site of its passage through the side wall 10 of the collector 9 is fluid-tight sealed.

The cooling water from the cooling water inlet 13 passes into the collector 9 from which it flows through the pipe 14 into the compensating tank 15. From the tank 15 cooling water flows through the depending tube 16 into the lower part of the space 8 enclosed by the conical part 3 and the shell 7. On its way through the space 8, the cooling water is heated and evaporated. The saturated steam thus generated is collected in the top part of the collector 9 and sent to the reactor through a steam pipe 17 which, as shown in FIG. 1, in particular, is connected to the compensating tank 15. A pipe 17' from the top of the tank 15 conveys saturated steam to the reactor.

A water level gauge 18 with a sensor 19 is connected to the compensating tank 15. The signals supplied by the sensing element 19 are converted in a control unit 20 and used to control a check valve 21 which controls the cooling water flow rate through the cooling water pipe 12 in such a way that the water level in the collector 9 and the compensating tank 15 remains constant.

Between the lower part of the space 8 and the cooling water pipe 12 a bypass line 22 is provided, which also includes a pump 23. Through the bypass line 22, it is possible to feed in warm water into the cooling water line to increase, e.g., the temperature of the water in the collector 9 to a value at which the saturated steam present in the collector 9 is kept from condensing. The bypass line 22 is also used for cooling water circulation, especially when the control valve 21 is shut.

What we claim is:

1. A reactor for pressure type gasification of coal comprising
    a reactor housing having an outer wall,
    a shell spaced from said outer wall to provide a cooling water jacket,
    means providing a collector chamber on the upper portion of said reactor housing and receiving cooling water from said jacket,
    pipe means leading from the upper portion of said chamber for conveying saturated steam therefrom to said reactor housing,
    a compensating tank spaced from the reactor housing,
    a tube connection between the lower end of said tank and the lower portion of said cooling water jacket,
    a sensor for indicating the cooling water level in said tank,
    a side wall of said collector chamber having an overflow lip, said side wall being disposed inside said shell, and
    an open ended pipe extending from said collector chamber through said shell to said compensating tank enabling cooling water to flow from said chamber to said tank.

2. A reactor as claimed in claim 1, in which said open ended pipe is disposed horizontally at the bottom of said collector chamber.

3. A reactor as claimed in claim 2, in which a fluid tight seal is provided between said open ended pipe and the side wall of said collector chamber.

4. A reactor as claimed in claim 1, comprising an inward extension on the upper end of the outer wall of the reactor housing providing the bottom wall of said collector chamber, and an upward extension of said inward extension provides the inner wall of said chamber.

5. A reactor as claimed in claim 1, comprising a bypass pipe extends from the lower part of said cooling water jacket above said tube connection from said tank, a pump in said bypass pipe, pipe means for providing cooling water to said reactor housing and from said housing to said collector chamber, and a connection between said bypass pipe and said cooling water pipe means.

6. A reactor as claimed in claim 5, comprising a valve in said cooling water pipe means, and means providing a sensor controlling said valve dependent upon the water level in said compensating tank.

7. A reactor as claimed in claim 1, in which said pipe means includes a pipe from said collector chamber to said compensating tank, and a pipe from said tank to said reactor housing.

* * * * *